US011181932B2

(12) United States Patent
Douglas et al.

(10) Patent No.: US 11,181,932 B2
(45) Date of Patent: *Nov. 23, 2021

(54) COMBINED PITCH AND FORWARD THRUST CONTROL FOR UNMANNED AIRCRAFT SYSTEMS (71) Applicant: L3 LATITUDE, LLC, Tucson, AZ (US)

(72) Inventors: Jason Michael K. Douglas, Tucson, AZ (US); Justin Armer, Tucson, AZ (US); Carlos Murphy, Tucson, AZ (US)

(73) Assignee: L3 LATITUDE, LLC, Tucson, AZ (US)

( * ) Notice: Subject to any disclaimer, the term of this patent is extended or adjusted under 35 U.S.C. 154(b) by 387 days.

This patent is subject to a terminal disclaimer.

(21) Appl. No.: 16/153,691

(22) Filed: Oct. 5, 2018

(65) Prior Publication Data

US 2019/0033890 A1 Jan. 31, 2019

Related U.S. Application Data (63) Continuation of application No. 15/131,944, filed on Apr. 18, 2016, now Pat. No. 10,162,367.

(51) Int. Cl.
*G05D 1/08* (2006.01)
*B64C 29/00* (2006.01)
(Continued)

(52) U.S. Cl.
CPC ....... *G05D 1/0858* (2013.01); *B64C 29/0025* (2013.01); *B64C 39/024* (2013.01);
(Continued)

(58) Field of Classification Search
CPC ........ B64C 2201/104; B64C 2201/108; B64C 2201/146; B64C 29/0025; B64C 39/024; G05D 1/0858
See application file for complete search history.

(56) References Cited

U.S. PATENT DOCUMENTS 2,540,404 A 2/1951 John
6,474,603 B1 11/2002 Kinkead
(Continued)

FOREIGN PATENT DOCUMENTS

EP 2966529 1/2016

OTHER PUBLICATIONS

Extended European Search Report dated Oct. 31, 2019 for European Application No. 17786375.0.
(Continued)

*Primary Examiner* — Ryan Rink
(74) *Attorney, Agent, or Firm* — Sheppard, Mullin, Richter & Hampton LLP (57) ABSTRACT A method of controlling forward thrust of an aircraft includes receiving a first pitch angle command; generating a second pitch angle command and a forward thrust engine throttle command based on a bounded pitch angle for the aircraft; comparing a determined bounded pitch angle for the aircraft to the pitch angle corresponding to the first pitch angle command; generating a reduced pitch angle command so the resultant aircraft pitch angle does not exceed the bounded pitch angle; and generating the forward thrust engine throttle command based on the reduced pitch angle command.

30 Claims, 6 Drawing Sheets (51) Int. Cl.
*B64C 39/02* (2006.01)
*G05D 1/00* (2006.01)

(52) U.S. Cl.
CPC ...... *G05D 1/0011* (2013.01); *B64C 2201/027* (2013.01); *B64C 2201/088* (2013.01); *B64C 2201/104* (2013.01); *B64C 2201/108* (2013.01); *B64C 2201/14* (2013.01); *B64C 2201/146* (2013.01)

(56) References Cited

U.S. PATENT DOCUMENTS

| | | | | |
|---|---|---|---|---|
| 7,267,300 | B2* | 9/2007 | Heath | B64C 15/14 244/12.3 |
| 7,448,571 | B1* | 11/2008 | Carter, Jr. | B64C 27/02 244/17.11 |
| 8,170,728 | B2* | 5/2012 | Roesch | B64C 27/22 701/3 |
| 8,376,266 | B2* | 2/2013 | Gemmati | B64C 27/22 244/17.19 |
| 8,583,295 | B2* | 11/2013 | Eglin | B64C 27/26 701/4 |
| 8,655,510 | B2* | 2/2014 | Eglin | B64C 27/26 701/3 |
| 8,690,096 | B2* | 4/2014 | Alvarez Calderon F. | B64C 39/08 244/6 |
| 8,840,057 | B2* | 9/2014 | Moret | B64C 27/12 244/6 |
| 9,120,560 | B1 | 9/2015 | Armer et al. | |
| 2003/0085319 | A1 | 5/2003 | Wagner | |
| 2004/0245374 | A1 | 12/2004 | Morgan | |
| 2005/0048918 | A1 | 3/2005 | Frost | |
| 2007/0018035 | A1* | 1/2007 | Saiz | B64C 29/0033 244/12.3 |
| 2008/0237392 | A1 | 10/2008 | Piasecki et al. | |
| 2008/0294305 | A1* | 11/2008 | Roesch | B64C 27/22 701/3 |
| 2011/0001020 | A1* | 1/2011 | Forgac | B64C 39/024 244/7 A |
| 2015/0197335 | A1* | 7/2015 | Dekel | B64C 27/52 701/5 |
| 2015/0314853 | A1* | 11/2015 | Tantot | B64D 31/06 701/3 |
| 2015/0344134 | A1* | 12/2015 | Cruz Ayoroa | B64C 39/12 244/48 |
| 2015/0367937 | A1* | 12/2015 | Greenfield | G05D 1/0858 701/4 |
| 2016/0009387 | A1* | 1/2016 | Kummer | B64C 29/0066 244/6 |
| 2016/0210863 | A1* | 7/2016 | Kohn-Rich | G08G 5/0086 |
| 2017/0225779 | A1* | 8/2017 | Gamble | B64C 29/0091 |
| 2018/0129226 | A1* | 5/2018 | Rogers | G05D 1/105 |
| 2020/0342065 | A1* | 10/2020 | Chen | H04L 67/1095 |

OTHER PUBLICATIONS

ISR and Written Opinion for PCTUS1727526 dated Jul. 14, 2017, 9 pages.
Examination Report dated Sep. 17, 2020 for European Application No. 17786375.0.
Non-final Office Action dated Oct. 30, 2020 for U.S. Appl. No. 16/153,683, filed Oct. 5, 2018.

* cited by examiner

COMBINED PITCH AND FORWARD THRUST CONTROL FOR UNMANNED AIRCRAFT SYSTEMS

CROSS-REFERENCE TO RELATED APPLICATIONS

This application is a divisional application and claims the benefit of U.S. application Ser. No. 15/131,944, filed on Apr. 18, 2016, all of which are incorporated herein by reference in their entirety.

TECHNICAL FIELD

The disclosed technology relates generally to aircraft control systems, and more particularly, some embodiments relate to combining forward thrust control of a multirotor vertical propulsion system with thrust control of the forward propulsion system to control the aircraft in hovering flight across a wide range of air speeds.

DESCRIPTION OF THE RELATED ART

Unmanned aircraft have become ubiquitous in today's society. Their importance and value has grown dramatically in recent years, leading to widespread adoption in commercial, military and consumer market sectors. Part of the reason for their popularity is their low cost and small form factor as compared to piloted aircraft. However, the small engines used in various Unmanned Aircraft Systems (UAS) have demonstrated a lower reliability as compared to piloted aviation engines.

Hybrid aircraft use a combination of vertical takeoff and landing (VTOL) propulsion systems to allow the aircraft to take off and land vertically (e.g., like a helicopter) and forward propulsion systems for fixed-wing flight. A hybrid quadrotor aircraft, for example uses four VTOL rotors and one or more forward propulsion rotors. Quadrotor, octorotor, and other multirotor configurations for the VTOL propulsion system are popular because they allow attitude control as well as control of angular acceleration, rate, and even aircraft velocity and position. That is, flight dynamics can be controlled by individually controlling the motor power or RPM of each rotor to control the torque on the aircraft.

With a standard multirotor control, the aircraft must pitch forward in order to achieve positive acceleration. While this may be acceptable for non-fixed-wing aircraft, it is undesirable in hybrid multirotor aircraft because a negative angle of attack of the fixed wing under conditions of more than minimal airspeed would cause a downward force on the aircraft. This would require the VTOL propulsion system to provide additional thrust to maintain altitude and would add further drag to the aircraft. This further drag would, in turn, require additional forward tilt for compensation.

Existing hybrid multirotor designs separate the functions of VTOL flight and forward acceleration into fixed wing flight. During VTOL operations, the VTOL rotors are controlled using a typical multirotor method, which may include pitching forward to increase forward speed. During acceleration to fixed wing flight as well as during fixed wing flight, the forward thrust rotor is used to accelerate the aircraft. This scheme, however, does not provide adequate control of the aircraft during hovering modes in which a non-trivial airspeed is required, such as hovering in windy conditions.

Hybrid aircraft control systems typically separate control the pitch angle and control of forward engine thrust. With such configurations, however, the integrators may end up fighting each other to achieve stable control, but at a reduced efficiency. For example, a large pitch up command combined with a large forward thrust may result in stable position control, but both systems are working harder than desired.

BRIEF SUMMARY OF EMBODIMENTS

According to various embodiments of the disclosed technology systems and methods for pitch angle forward thrust of an aircraft is combined with forward thrust of the main fixed-wing engine or engines to allow control of forward velocity of the aircraft. In some embodiments, this can be implemented so as to allow the aircraft remain level in hovering flight across a wide range of air speeds.

According to an embodiment of the disclosed technology, an unmanned aircraft may include: a forward propulsion system comprising a forward thrust engine and a first rotor coupled to the forward thrust engine; a vertical propulsion system that includes a vertical thrust engine and a second rotor coupled to the vertical thrust engine; and a pitch angle and throttle control system. The pitch angle and throttle control system may include: a controller comprising an input coupled to receive a velocity signal indicating a determined amount of forward velocity and being configured to generate a pitch angle command associated with the determined amount of forward velocity; a splitting block comprising an input to receive the pitch angle command and being configured to generate a second pitch angle command and a forward thrust engine throttle command based on a bounded pitch angle for the aircraft; an output coupled to provide the second pitch angle command to the vertical propulsion system and the forward thrust engine throttle command to the forward propulsion system.

The splitting block in various embodiments may include a processor configured to perform the operations of comparing a determined bounded pitch angle for the aircraft to the pitch angle corresponding to the pitch angle command; generating a reduced pitch angle command so the resultant aircraft pitch angle does not exceed the bounded pitch angle; and generating the forward thrust engine throttle command based on the reduced pitch angle command.

Generating the forward thrust engine throttle command based on the reduced pitch angle command may include: determining a forward velocity generated by the limited pitch angle command; determining a difference in forward velocity between forward velocity generated by the limited pitch angle and the determined amount of forward velocity; generating a residual pitch angle command based on the determined difference in forward velocity; and converting the residual pitch angle command to the forward thrust engine throttle command.

The residual pitch angle command may be of a magnitude estimated to provide sufficient forward thrust to account for the determined difference in forward velocity. The determined amount of forward velocity may include a velocity error between a desired aircraft velocity and an actual aircraft velocity. The velocity signal may include a velocity error signal.

The controller may include proportional-integral-derivative (PID) controller to provide the forward thrust pseudo-control in the time domain.

The thrust pitch angle command may be given by:

$$PitchAngle = K_p e(t) + K_i \int e(t)dt + K_d \frac{de}{dt}$$

where the e represents the velocity error.

In some embodiments, providing the second pitch angle command to the vertical propulsion system may include converting the second pitch angle command to a VTOL rotor command and providing the VTOL rotor command to the vertical propulsion system.

The unmanned aircraft may be a multirotor aircraft and the vertical propulsion system may include a plurality of vertical thrust engines and corresponding rotors. In further embodiments, the unmanned aircraft may be a hybrid quadrotor aircraft.

The bounded pitch angle may include a maximum pitch angle, or a range of pitch angles between a minimum pitch angle and a maximum pitch angle.

I yet another embodiment, an unmanned aircraft system, may include an unmanned aircraft and a remote control system. The unmanned aircraft, may include: a forward propulsion system comprising a forward thrust engine and a first rotor coupled to the forward thrust engine; a vertical propulsion system comprising a vertical thrust engine and a second rotor coupled to the vertical thrust engine; an onboard aircraft controller comprising a first output coupled to the forward propulsion system and a second output coupled to the vertical propulsion system; and a first communication transceiver coupled to the aircraft controller configured to communicate with a remote control system. The remote control system, may include: a second communication transceiver configured to communicate with the unmanned aircraft; an aircraft control system communicatively coupled to the second communication transceiver; and a pitch angle and throttle control system, comprising a processor configured to receive a velocity signal indicating a determined amount of forward velocity and being configured to generate a pitch angle command associated with the determined amount of forward velocity; receive the pitch angle command and being configured to generate a second pitch angle command and a forward thrust engine throttle command based on a bounded pitch angle for the aircraft; and provide the second pitch angle command to the vertical propulsion system and the forward thrust engine throttle command to the forward propulsion system.

In various embodiments, the pitch angle and throttle control system may be part of the onboard aircraft controller or the aircraft control system of the remote control system.

In yet another embodiment, an unmanned aircraft, may include a forward propulsion system comprising a forward thrust engine and a first rotor coupled to the forward thrust engine; a vertical propulsion system comprising a vertical thrust engine and a second rotor coupled to the vertical thrust engine; and a pitch angle and throttle control system, comprising a processor configured to receive a first pitch angle command; and generate a second pitch angle command and a forward thrust engine throttle command based on a bounded pitch angle for the aircraft. The processor may further perform the operations of comparing a determined bounded pitch angle for the aircraft to the pitch angle corresponding to the first pitch angle command; generating a reduced pitch angle command so the resultant aircraft pitch angle does not exceed the bounded pitch angle; and generating the forward thrust engine throttle command based on the reduced pitch angle command.

Generating the forward thrust engine throttle command based on the reduced pitch angle command may include determining a residual amount of forward thrust needed to compensate for the reduced pitch angle command and generating the forward thrust engine throttle command to at least partially provide the residual amount of forward thrust needed. In other embodiments, generating the forward thrust engine throttle command based on the reduced pitch angle command may include: determining a forward velocity generated by the limited pitch angle command; determining a difference in forward velocity between forward velocity generated by the limited pitch angle and the determined amount of forward velocity; generating a residual pitch angle command based on the determined difference in forward velocity; and converting the residual pitch angle command to the forward thrust engine throttle command. The residual pitch angle command may be of a magnitude estimated to provide sufficient forward thrust to account for the determined difference in forward velocity.

In some embodiments the processor may further perform the operations including comparing a determined bounded pitch angle for the aircraft to the pitch angle corresponding to the first pitch angle command; generating a reduced pitch angle command so the resultant aircraft pitch angle does not exceed the bounded pitch angle; generating a residual pitch angle command based on a difference between the first pitch angle command and the reduced pitch angle command; and converting the residual pitch angle command into a forward thrust throttle command.

The processor may further perform the operations including receiving a velocity signal indicating a determined amount of forward velocity and generating the pitch angle command to provide the determined amount of forward velocity. The determined amount of forward velocity may include a velocity error between a desired aircraft velocity and an actual aircraft velocity.

The processor may further perform the operations of converting the second pitch angle command to a VTOL rotor command and providing the VTOL rotor command to the vertical propulsion system.

In still further embodiments, a method of controlling forward thrust of an aircraft includes: receiving a first pitch angle command; and generating a second pitch angle command and a forward thrust engine throttle command based on a bounded pitch angle for the aircraft. The method may further include comparing a determined bounded pitch angle for the aircraft to the pitch angle corresponding to the first pitch angle command; generating a reduced pitch angle command so the resultant aircraft pitch angle does not exceed the bounded pitch angle; and generating the forward thrust engine throttle command based on the reduced pitch angle command. In some embodiments, generating the forward thrust engine throttle command based on the reduced pitch angle command may include determining a residual amount of forward thrust needed to compensate for the reduced pitch angle command and generating the forward thrust engine throttle command to at least partially provide the residual amount of forward thrust needed.

In other embodiments, generating the forward thrust engine throttle command based on the reduced pitch angle command may include: determining a forward velocity generated by the limited pitch angle command; determining a difference in forward velocity between forward velocity generated by the limited pitch angle and the determined amount of forward velocity; generating a residual pitch angle command based on the determined difference in forward velocity; and converting the residual pitch angle command to the forward thrust engine throttle command.

The method may further include comparing a determined bounded pitch angle for the aircraft to the pitch angle corresponding to the first pitch angle command; generating a reduced pitch angle command so the resultant aircraft pitch angle does not exceed the bounded pitch angle; generating a residual pitch angle command based on a difference between the first pitch angle command and the reduced pitch angle command; and converting the residual pitch angle command into a forward thrust throttle command.

The method may also include receiving a velocity signal indicating a determined amount of forward velocity and generating the pitch angle command to provide the determined amount of forward velocity. The determined amount of forward velocity may include a velocity error between a desired aircraft velocity and an actual aircraft velocity. Also, the velocity signal may include a velocity error signal.

The method may also include converting the second pitch angle command to a VTOL rotor command and providing the VTOL rotor command to the vertical propulsion system.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing a control scheme for an unmanned aircraft system in which the forward thrust control of a multirotor VTOL propulsion system (i.e., pitch angle) is combined with forward thrust control of the main fixed-wing forward propulsion system. Further embodiments can be configured to provide this combined control to allow the aircraft to remain level in hovering flight across a wide range of airspeeds. Embodiments of this combined control may be used in a number of aircraft modes including in the strict hovering mode and in transition or a modes when the aircraft is transitioning from forward flight to vertical landing.

In various embodiments, this combined control may be achieved by abstracting the forward thrust control command into a pseudo-control, which is then split into pitch angle and engine thrust command components. These components can be fed to the aircraft systems to control the forward and VTOL propulsion systems of the aircraft. Actual velocity can be measured and compared with (e.g., subtracted from) the desired velocity to obtain a velocity error. The velocity error can be used to generate the forward thrust pseudo-control used to feed the splitting function.

Figure 1:
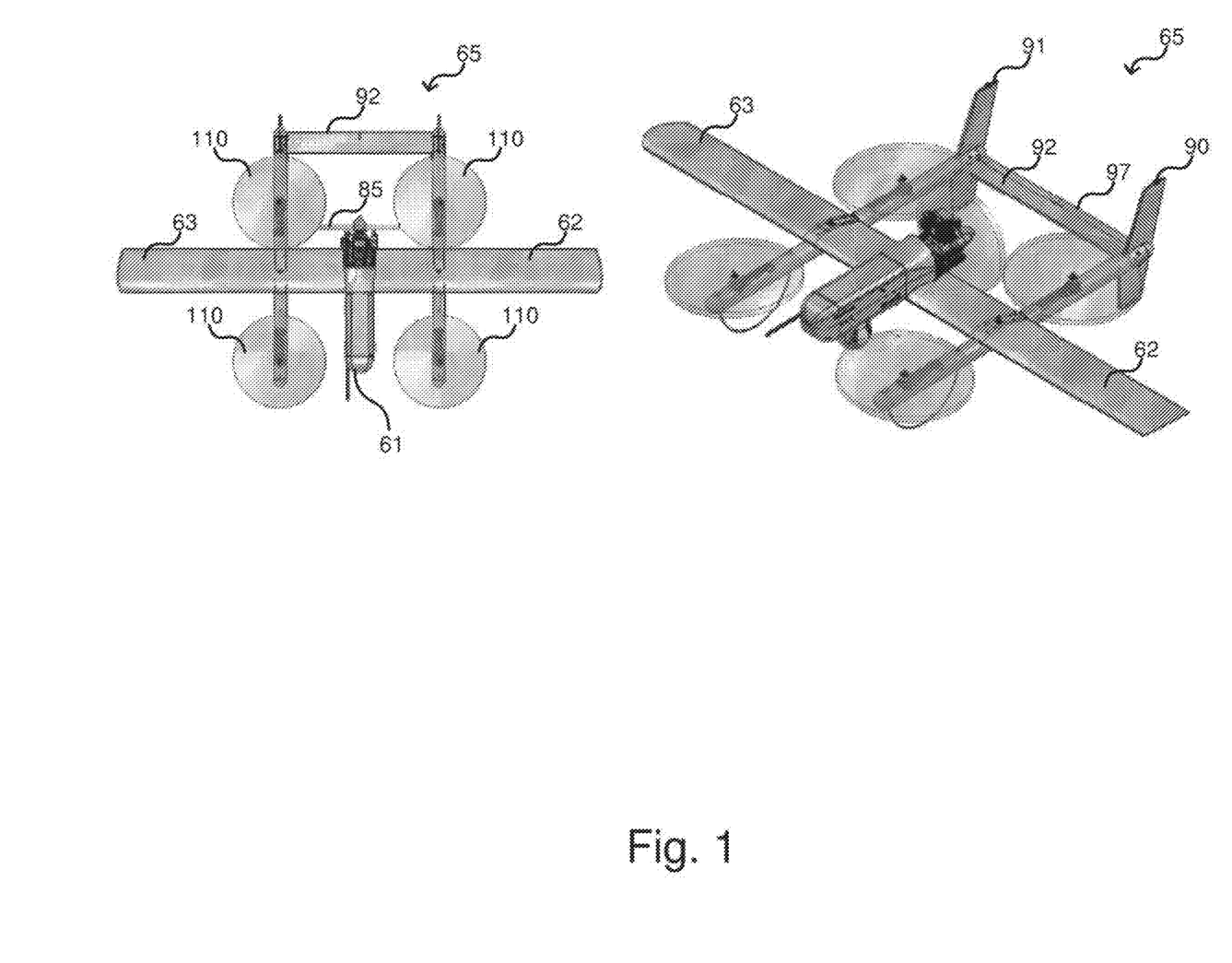
FIG. 1 illustrates an example unmanned vertical take-off and landing (VTOL) aircraft with which embodiments of the technology disclosed herein may be implemented.
Figure 2:
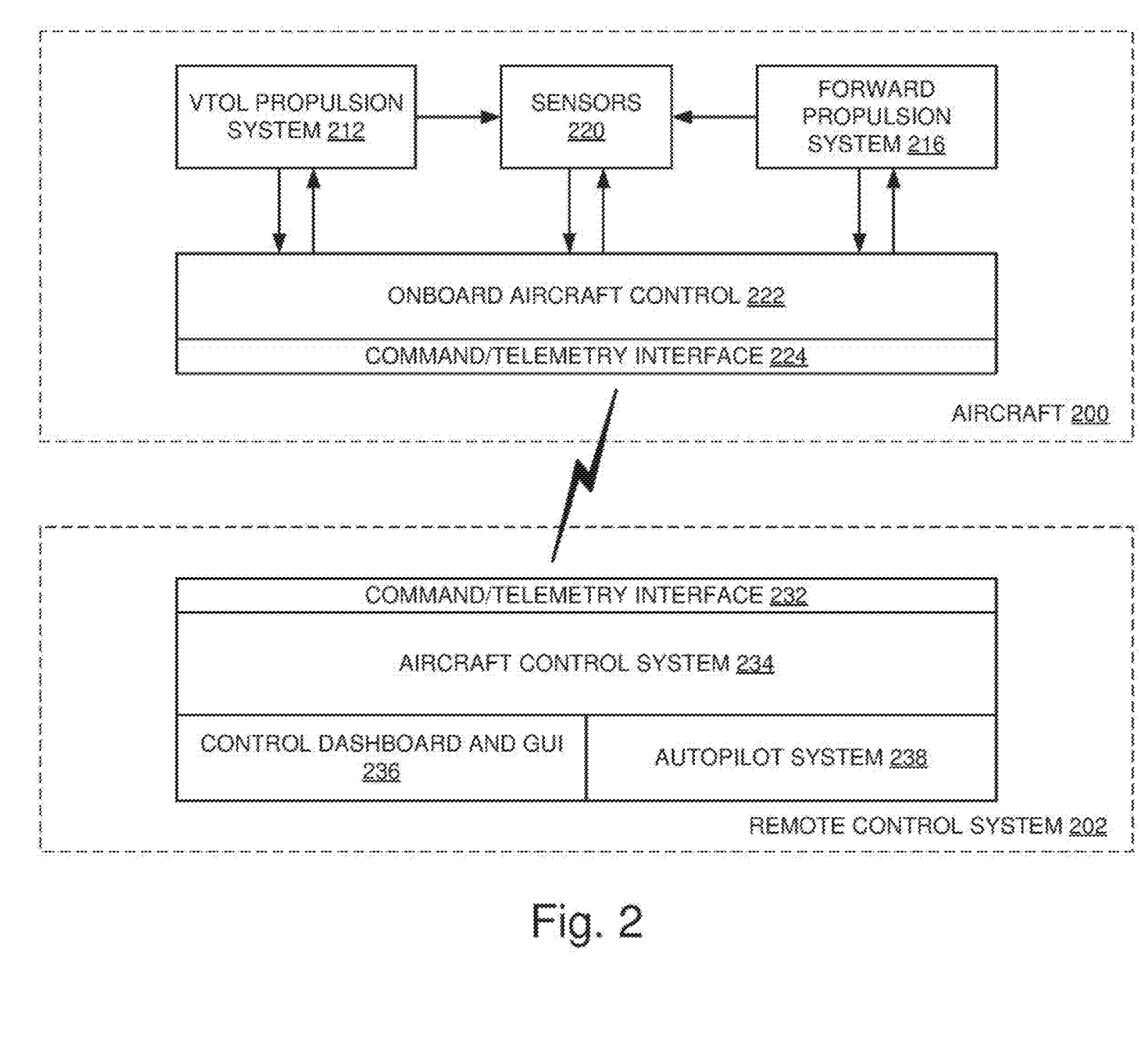
FIG. 2 is a diagram illustrating an example unmanned aircraft with which embodiments of the technology disclosed herein may be implemented.

Before describing embodiments of the systems and methods in detail, it is useful to describe an example aircraft with which such systems and methods can be used. FIG. 1 is a diagram illustrating an example unmanned vertical take-off and landing (VTOL) aircraft with which the technology disclosed herein may be implemented. FIG. 2 is a diagram illustrating an example unmanned aircraft system in including an example unmanned aircraft an example remote control system.

Referring now to FIG. 1, this example aircraft is a hybrid quadrotor aircraft having an airframe that includes fuselage 61, fixed left and right wings 62 and 63, a tail assembly or empennage 65. Also shown are left and right tail boom supports (not numbered for clarity of the illustration), and left and right head boom supports. Left and right wings 62 and 63 are fixed to fuselage 61 to form a fixed wing airframe.

Left wing 62 and right wing 63 are airfoils that produce lift to facilitate aircraft flight. During flight, air passing over the wing creates a region of lower-than-normal air pressure over top surfaces of left and right wings 62 and 63, with a higher pressure existing on the bottom surfaces of left and right wings 62 and 63. This results in a net upward force acting on left and right wings 62 and 63 to generate lift. Left wing 62 is applied to and extends from left side of fuselage 61 and right wing 63 is applied to and extends from right side of fuselage 61. Although not shown, a left aileron is pivotally retained at the rear of left wing 62 near its outer or distal extremity, and a right aileron is pivotally retained at the rear of right wing 63 near the outer or distal extremity of right wing 63.

Empennage 65 gives stability to the aircraft, and is located behind and in spaced-apart relation to the trailing extremity of fuselage 61. In this embodiment, empennage 65 is exemplary of a twin tail assembly or twin tail empennage may include left and right vertical stabilizers 90, 91, and a horizontal stabilizer 92 extending between left and right vertical stabilizers. The left and right vertical stabilizers 90, 91 extend upward from a rear of their corresponding left and right tail boom supports while the horizontal stabilizer 92 is retained between left and right tail boom supports. Rudders, not shown, may be pivotally retained on the trailing edge of left and right stabilizers 90, 91. An elevator 97 is pivotally retained on a rear of horizontal stabilizer 92.

This example aircraft is a hybrid craft including separate rotors for forward and vertical thrust. Particularly, this example is a hybrid quadrotor "X" configuration. Accordingly, this example illustrates a forward thrust rotor 85, which is mounted to the rear extremity of fuselage 61 in front of empennage 65. Forward thrust rotor 85, which provides forward thrust to aircraft 50, is typically powered by a forward propulsion engine, sometimes referred to as a main engine. This example uses a single forward thrust rotor mounted at the rear of the fuselage 61. However, the technology can be applied to aircraft using one or multiple thrust rotors mounted at other positions.

The example aircraft also includes a VTOL propulsion system, or simply a VTOL system, to provide vertical thrust for vertical takeoff and landing operations. This example is a quadrotor VTOL system including four VTOL thrust rotors 110 in a quadrotor "X" pattern for providing vertical lift and yaw control authority to the aircraft. In other applications, the technology disclosed herein may be applied to aircraft having a different quantity of VTOL thrust rotors, or thrust rotors at different locations. VTOL aircraft can include fixed-mount VTOL thrust rotors or pivot-mount VTOL thrust rotors. Forward thrust engines and vertical thrust engines can be internal combustion engines or electric motors or a combination of the two.

Referring now to FIG. 2, the example illustrated in FIG. 2 includes an unmanned aircraft 200 and a remote control system 202 for the aircraft 200. In this example, aircraft 200 includes a VTOL propulsion system 212, a forward propulsion system 216, various sensors 220, and onboard aircraft control system 222, and a command/telemetry interface 224.

VTOL propulsion system 212 includes systems and components used for vertical takeoff and landing. This can include, for example, one or more rotors, corresponding engines or motors, and other systems associated with VTOL propulsion. In various embodiments, the rotor or rotors of VTOL propulsion system 212 are oriented horizontally or in an approximately horizontal configuration. The rotor or rotors of VTOL propulsion system 212 can be mounted in a fixed orientation, or can be movably mounted such that their orientation can be adjusted from the horizontal configuration. VTOL propulsion system 212 can include one or more inputs to receive data, commands, control information, or other information to operate or maintain the propulsion systems or components thereof. For example, a throttle control input can be provided to adjust the throttle setting for the propulsion system. VTOL propulsion system 212 can also include one or more outputs to send data and other information about the propulsion system to other instrumentalities such as, for example, onboard aircraft control system 222 or one or more sensors 220.

Forward propulsion system 216 includes one or more rotors, corresponding engines or motors, and other systems associated with forward propulsion. The rotor or rotors of forward propulsion system 216 are oriented vertically or in an approximately vertical configuration to provide forward or reverse thrust to the aircraft. The rotor or rotors of forward propulsion system 216 are generally mounted in a fixed orientation, but in some embodiments may be movably mounted such that their orientation can be adjusted from the vertical configuration. Forward propulsion system 216 can also include one or more outputs to send data and other information about the propulsion system to other instrumentalities such as, for example, onboard aircraft control system 222 or one or more sensors 220. Forward propulsion system 216 can include one or more inputs to receive data, commands, control information, or other information to operate or maintain the propulsion systems or components thereof. For example, a throttle control input can be provided to adjust the throttle setting for the propulsion system.

Sensors 220 can include one or more various sensors to sense operating parameters of the aircraft and its various systems and subsystems. For example, sensors 220 can include sensors such as temperature sensors, RPM sensors, airspeed sensors, altimeters, position determination systems (e.g. GPS or other position determination systems) vibration sensors, gyros, accelerometers, and so on. Sensors can accordingly sense conditions or other operating parameters of aircraft 200 and its various systems and subsystems. Although illustrated as a single block in this diagram, sensors 220 can include individual discrete sensors disposed in various positions about the aircraft to sense the appropriate parameters.

Command/telemetry interface 224 provides a communication interface to allow aircraft 200 to communicate, preferably two-way, with remote control system 202. Accordingly, command/telemetry interface 224 can include an antenna and a communication transceiver to provide wireless communications so they can receive command and control information from remote control system 202 as well as send data or other telemetry to remote control system 202.

Onboard aircraft control system 222 is provided to control the various components of the aircraft based on commands received from remote control system 202 (e.g., via the command/telemetry interface 224). Onboard aircraft control system 222 can also be configured to receive information from other aircraft components such as, for example, sensor data, and provide that information to command/telemetry interface 224 for transmission to remote control system 202.

Although the functional components of aircraft 200 (e.g., onboard aircraft control system 222, command/telemetry interface 224 and automatic aircraft recovery system 240) are partitioned in this example in the manner as illustrated in FIG. 2, it is noted that this partitioning is done for clarity of description and by way of example only. After reading this description, one of ordinary skill in the art will understand how different architectures or alternative partitioning can be used for systems of aircraft 200. Additionally, components such as processing devices, memory components, communications buses and so on can be shared among these multiple functional units. Indeed, in some applications, for example, a single microprocessor (whether single or multi-core) system can be used to implement the functions of onboard aircraft control system 222, and automatic aircraft recovery system 240, as well as portions command/telemetry interface 224, sensors 220, and even digital/electronic portions of the various propulsion systems.

Remote control system 202 in this example includes a command/telemetry interface 232, and aircraft control system 234 a control dashboard and user interface 236 and an autopilot system 238. Command/telemetry interface 232 provides a wireless communication interface to aircraft 200. In some embodiments, remote control system 202 can be used to command multiple aircraft, in which case command/telemetry interface 232 can provide a communication interface to multiple aircraft.

Control dashboard and GUI 236 provides a user interface to the remote pilot to allow the pilot to control one or more aircraft such as aircraft 200. Control dashboard and GUI 236 can be configured to provide visual, audible, and tactile feedback and information to the pilot regarding flight of the aircraft and various aircraft parameters. You can also include user input mechanisms to allow the pilot to control the aircraft remotely. These user input mechanisms can include, for example, buttons, switches, levers, joysticks, keys, touchscreen inputs, or other actuators to enable the pilot to provide input and adjust aircraft settings. This can allow the pilot to control, for example, throttle settings for the various propulsion systems, to adjust the rudder and ailerons, and so on.

Inputs from the user are interpreted by aircraft control system 234 to translate user inputs into commands for aircraft control. In some applications, this can be a translation of direct commands such as throttle inputs, rudder control, flap adjustment and so on. Control inputs can also include higher level commands such as rotation rate or rate over ground, etc., which can be translated into aircraft system control commands. These commands are communicated to aircraft 200 via command/telemetry interface 232 and command/telemetry interface 224. Functionality for aircraft control can be distributed among aircraft control system 234 and onboard aircraft control 222 as may be appropriate depending on the system configuration.

An autopilot system 238 can also be provided to control the aircraft via computerized or automated control with little or no input required by a human pilot. Although illustrated in this example as part of remote control system 202, part or all of the functionality of autopilot system 238 can be provided at aircraft 200. Although not illustrated, in some embodiments an onboard autopilot system can be included with the aircraft 200 to enable local autopilot control, which may ease the load on the command/telemetry interfaces.

Although the functional components of remote control system 202 (e.g., aircraft control system 234, control dashboard and GUI 236, autopilot system 238, and command/telemetry interface 232) and aircraft 200 are partitioned in this example in the manner as illustrated in FIG. 2, it is noted that this partitioning is done for clarity of description and by way of example only. After reading this description, one of ordinary skill in the art will understand how different architectures or alternative partitioning can be used for aircraft 200 or remote control system 202. Additionally, components such as processing devices, memory components, communications buses, and so on can be shared among these multiple functional units. Indeed, in some applications, for example, a single microprocessor (whether single or multi-core) system can be used to implement the various described functions of remote control system 202 (e.g., aircraft control system 234, and autopilot system 238, as well as portions of control dashboard in GUI 236 and command/telemetry interface 232) or aircraft 200.

Having thus described an example aircraft and unmanned aircraft system with which one or more aspects of the disclosed technology can be implemented, various embodiments are now described. Although the disclosed technology may be described from time to time herein in terms of this example aircraft, one of ordinary skill in the art reading this disclosure will understand how aspects of the disclosed technology can be implemented with different aircraft and different aircraft configurations. This can include different configurations of unmanned aircraft as well as various configurations of manned aircraft.

Figure 3:
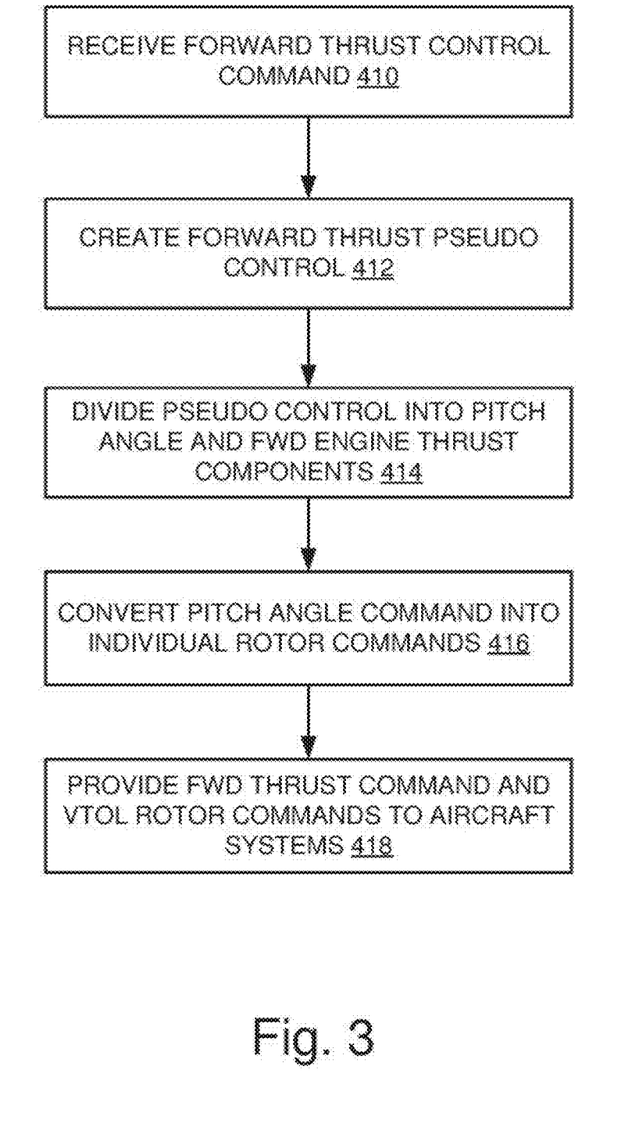
FIG. 3 is a diagram illustrating an example process for combined pitch and forward thrust control in accordance with one embodiment of the systems and methods described herein.
Figure 4:
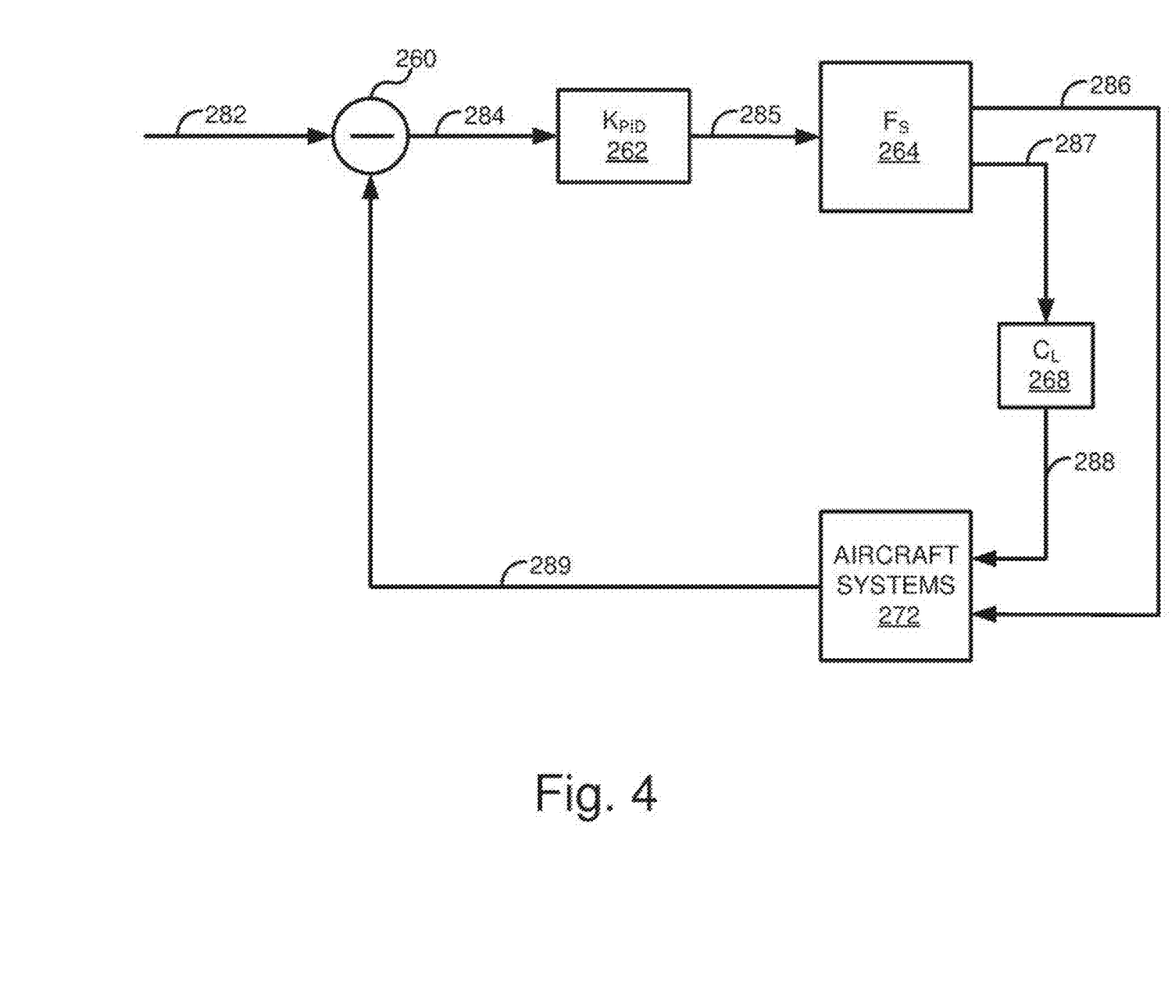
FIG. 4 is a diagram illustrating an example control loop combined pitch and forward thrust control in accordance with one embodiment of the systems and methods described herein.

FIG. 3 is a diagram illustrating an example process for combined thrust control in accordance with one embodiment of the systems and methods described herein. FIG. 4 is a diagram illustrating an example control loop for combined thrust control in accordance with one embodiment of the systems and methods described herein. With reference now to FIGS. 3 and 4, at operation 410 the aircraft control system receives a forward thrust control command. This command can be generated, for example, based on throttle position or based on desired aircraft speed (such as from an autopilot or like system). In the example illustrated in FIG. 4, the desired velocity 282 is compared to the actual velocity 289 to generate a velocity error signal 284.

At operation 412, control system uses the velocity error signal 284 to generate a forward thrust pseudo-control 285. The forward thrust pseudo-control 285 maps to a pitch angle for the aircraft that would normally be used to command the VTOL rotors. Thus, the forward thrust pseudo-control 285 can also be referred to as a pitch-angle command to control the pitch-angle of the aircraft to add forward velocity. PID control 262 can be implemented as a proportional-integral-derivative (PID) controller to provide the forward thrust pseudo-control in the time domain where the forward thrust pseudo-control 285 is given by:

$$PitchAngle = K_p e(t) + K_i \int e(t)dt + K_d \frac{de}{dt}$$

where the e represents the velocity error 284, and PID control 262 computes both the derivative and the integral of this velocity error 284. In this example, forward thrust pseudo-control 285 is given by the product of the proportional gain $K_p$ and the magnitude of the velocity error 284 plus the integral gain, $K_i$, times the integral of the velocity error 284 the derivative gain, $K_d$, times a derivative of the error. This allows the control signal to be generated based not only on the current error but also one past error as well as the rate of change of the error signal. In other embodiments, other controller types such as PI, PD, P or I controllers can be used to generate the forward thrust pseudo-control.

At operation 414, the forward thrust pseudo-control signal 285 is divided into a pitch angle command 287 and a forward thrust throttle command 286 by the splitting function 264. Splitting function 264 evaluates the forward thrust pseudo-control 285 in light of a determined maximum pitch angle for the aircraft and generates the two new command signals, pitch angle command 287 and forward thrust throttle command 286, based on the forward thrust needed and the determined maximum pitch angle. In other embodiments, Splitting function 264 evaluates the forward thrust pseudo-control 285 in light of a determined minimum pitch angle or in light of a range between a minimum and maximum pitch angle.

Figure 5:
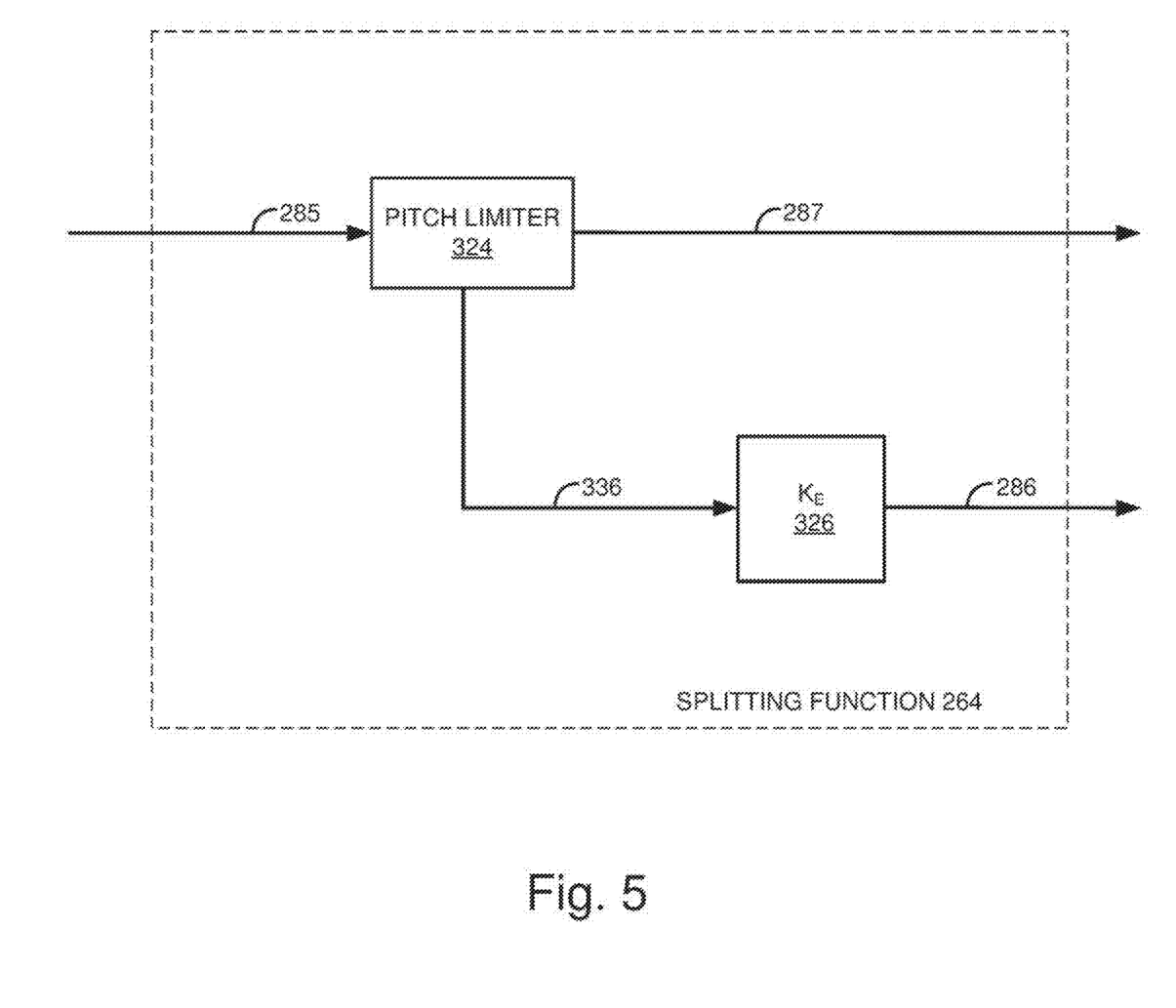
FIG. 5 illustrates an example splitting function in accordance with one embodiment of the systems and methods described herein.
Figure 6:
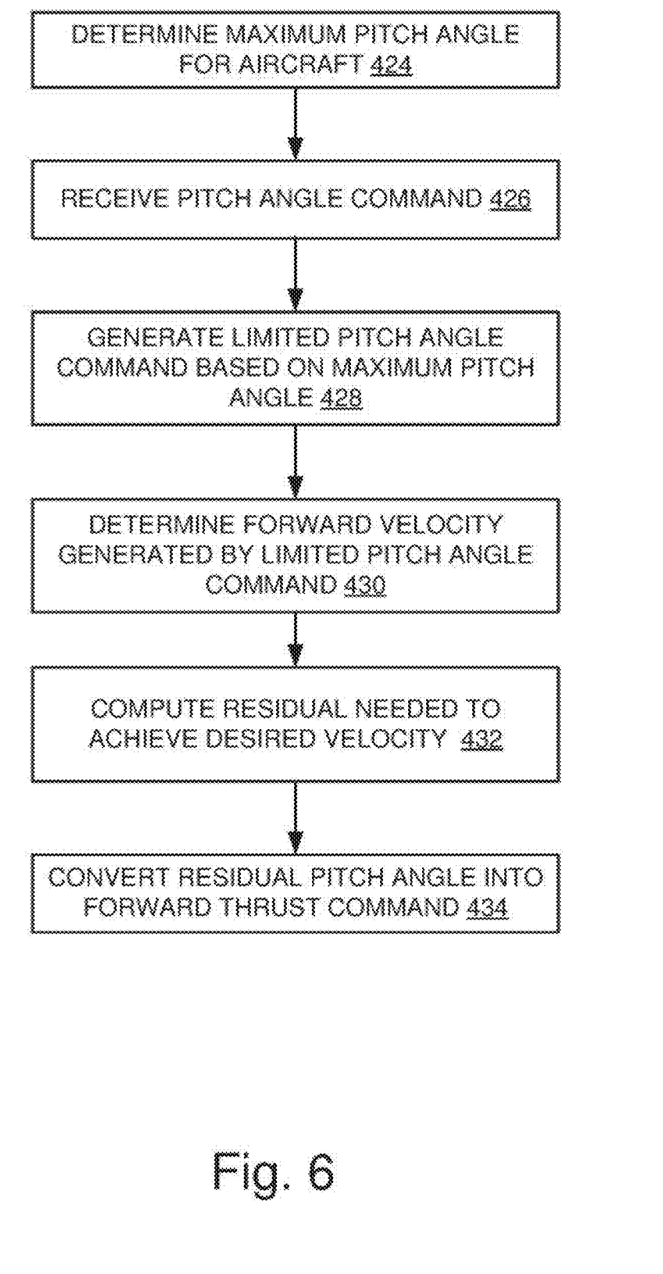
FIG. 6 illustrates an example process for generating pitch angle and forward thrust commands in accordance with one embodiment of the systems and methods described herein.

FIG. 5 is a diagram illustrating an example implementation of a splitting function 264 in accordance with one embodiment of the systems and methods described herein. FIG. 6 is a diagram illustrating an example process for determining pitch angle and forward thrust commands in accordance with one embodiment of the systems and methods described herein. Turning now to FIGS. 5 and 6, in this example at operation 426, a pitch limiter 324 receives the pitch angle command, forward thrust pseudo-control 285. At operation 428, pitch limiter 324 limits the pitch angle command to limit the amount of forward pitch and outputs this as a new limited pitch angle command 287. For example, the pitch angle command 287 may be limited such that the forward pitch of the aircraft does not exceed a predetermined maximum or a percentage of a predetermined maximum as determined at operation 424. The predetermined maximum can be set based on a maximum amount of negative lift for the aircraft, which can be a maximum for an aircraft or a maximum based on current conditions. As another example, the pitch angle may be limited to require a minimum amount of pitch or the pitch angle can be bounded to a limited range of pitch angles between determined minimum and maximum pitch angles. The minimum and maximum pitch angles can be determined for the aircraft by an operator or aircraft designer and stored in memory. In other embodiments, minimum and maximum pitch angles can be determined algorithmically and may in some applications vary based on weather or other flight conditions, payload restrictions or other parameters.

At operation 430, pitch limiter 324 computes the amount of forward velocity (e.g., airspeed) that will be generated by the limited pitch angle command 287. This can be an estimate of the airspeed based on the known rotor configuration for the aircraft. At operation 432, pitch limiter 324 computes the residual pseudo-control 336 needed beyond that provided by the limited pitch angle command to achieve the amount of control specified by forward thrust pseudo-control 285. This can be implemented, for example, by computing the residual pitch angle as the difference between the pseudo-command and the limited output.

At operation 434, the residual pseudo-control 336 a gain is applied by gain block 326 to converted this into a forward thrust throttle command 286. Accordingly, splitting function 264 generates a modified pitch angle command 287 and a forward thrust throttle command 286 to control the VTOL rotors and the forward thrust rotor(s), respectively. In some embodiments, the system generates the forward thrust engine throttle command by determining a residual amount of forward thrust needed to compensate for the reduced pitch angle command and generating the forward thrust engine throttle command to at least partially provide the residual amount of forward thrust needed. As noted above, this can be accomplished by generating a residual pitch angle command and converting the residual pitch angle command into a forward thrust throttle command.

Returning now to FIG. 3, at operation 416, the modified pitch angle command 287 is converted into VTOL rotor commands 288 for the VTOL rotors via control block 268. This function generates the command signals necessary to control the VTOL rotors to provide the pitch angle determined. At operation 418, the forward thrust throttle command 286 and VTOL rotor commands 288 are provided to their respective aircraft systems to generate the indicated amount of thrust. The resulting actual velocity of the aircraft after the application of these commands can be measured or estimated (e.g., via GPS or an airspeed sensor), an output as an actual velocity signal 289. At this point, a new error signal 284 can be computed by summing block 260 and the operation repeated.

The system configured to perform the functions for combined pitch and forward thrust control in accordance with the technology disclosed herein can be implemented on board the aircraft or at the remote control system, or the functions can be distributed across these two platforms. The various subsystems or blocks described herein may be implemented utilizing any form of hardware, software, or a combination thereof. These may be further referred to herein as a processing block, processing module, or processor. A processing block, processing module, or processor may include, for example, one or more processors, controllers, central processing units, ASICs, PLAs, PALs, PLDs, CPLDs, FPGAs, logical components, or other mechanism or device that manipulates or operates on signals, whether analog or digital, based on hard coding or wiring of the circuitry, the execution of operational instructions, or a combination thereof.

The processing block, processing module, or processor may further include, memory (separate, integrated or embedded from the one or more processors), which may be include one or more memory devices. Such a memory device may include, for example, one or a combination of memory types such as read-only memory, random access memory, volatile and non-volatile memory, static memory, dynamic memory, flash memory, cache memory, or other information storage device, whether magnetic, acoustic, optical or otherwise.

One or more processing devices may be centrally located or may be distributed across locations (e.g., cloud computing via indirect coupling via a local area network and/or a wide area network). For example, in implementation, the various subsystems or blocks described herein might be implemented as discrete modules or the functions and features described can be shared in part or in total among one or more processing modules. In other words, as would be apparent to one of ordinary skill in the art after reading this description, the various features and functionality described herein may be implemented in any given application and can be implemented in one or more separate or shared processing modules in various combinations and permutations. Even though various features or elements of functionality may be individually described or claimed as separate subsystems or blocks, one of ordinary skill in the art will understand that these features and functionality can be shared among one or more common software and hardware elements, and such description shall not require or imply that separate hardware or software components are used to implement such features or functionality.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of controlling forward thrust of an aircraft comprising,
    receiving a forward thrust control command;
    generating a control signal based on the forward thrust command;
    generating from the control signal a limited pitch angle command and a forward thrust engine throttle command based on a bounded pitch angle for the aircraft;
    wherein the limited pitch angle command is generated such that a resultant aircraft pitch angle does not exceed the bounded pitch angle; and
    wherein the forward thrust engine throttle command in combination with the resultant forward pitch angle achieves a determined amount of forward velocity.

2. The method of claim 1, wherein the forward thrust engine throttle command is also generated based on the limited pitch angle and wherein generating the forward thrust engine throttle command comprises determining a residual amount of forward thrust needed to achieve the determined amount of forward velocity based on the limited pitch angle command and generating the forward thrust engine throttle command to at least partially provide the determined residual amount of forward thrust.

3. The method of claim 1, wherein the forward thrust engine throttle command is also generated based on the limited pitch angle and wherein generating the forward thrust engine throttle command comprises: determining a forward velocity generated as a result of the limited pitch angle command; determining a difference in forward velocity between the forward velocity generated as a result of the limited pitch angle and the determined amount of forward velocity; generating a residual pitch angle command based on the determined difference in forward velocity; and converting the residual pitch angle command to the forward thrust engine throttle command.

4. The method of claim 3, wherein the residual pitch angle command is of a magnitude estimated to provide sufficient forward thrust to account for the determined difference in forward velocity.

5. The method of claim 1, further comprising: comparing a determined bounded pitch angle for the aircraft to a pitch angle corresponding to the control signal; generating a limited pitch angle command so the resultant aircraft pitch angle does not exceed the bounded pitch angle; generating a residual pitch angle command based on a difference between the determined amount of forward velocity and the amount of forward velocity achieved by the limited pitch angle command; and converting the residual pitch angle command into the forward thrust engine throttle command.

6. The method of claim 1, further comprising receiving a velocity signal indicating a determined amount of forward velocity and generating the forward velocity command to provide the determined amount of forward velocity.

7. The method of claim 6, wherein the determined amount of forward velocity comprises a velocity error between a desired aircraft velocity and an actual aircraft velocity.

8. The method of claim 6, wherein the determined amount of forward velocity comprises a difference between an actual forward velocity of the aircraft and a desired forward velocity of the aircraft.

9. The method of claim 1, further comprising converting the limited pitch angle command to a VTOL rotor command and providing the VTOL rotor command to a vertical propulsion system of the aircraft.

10. The method of claim 1, wherein the control signal comprises a pitch angle command to control the pitch angle of the aircraft to at least partially control forward velocity of the aircraft.

11. The method of claim 1, wherein the control signal comprises a forward thrust pseudo-control that maps to a pitch angle of the aircraft to increase forward velocity of the aircraft.

12. The method of claim 11, wherein the forward thrust pseudo-control is based on a magnitude of a velocity error between a desired aircraft velocity and an actual aircraft velocity.

13. The method of claim 3, wherein the residual pitch angle command is computed as a function of a difference between a velocity achieved with the limited pitch angle and the determined amount of forward velocity.

14. The method of claim 1, wherein the bounded pitch angle comprises a maximum pitch angle.

15. The method of claim 1, wherein the bounded pitch angle comprises a range of pitch angles between a minimum pitch angle and a maximum pitch angle.

16. The method of claim 1, wherein the forward thrust control command is generated based on a throttle position of a throttle control of the aircraft or based on a desired velocity for the aircraft.

17. The method of claim 1, wherein the control signal is generated based on a velocity error signal, and wherein the velocity error signal indicates a difference between a desired velocity for the aircraft and an actual velocity of the aircraft.

18. The method of claim 16, wherein the desired velocity for the aircraft is determined based on a throttle position of a throttle control of the aircraft or based on input from an autopilot system.

19. A method of controlling forward thrust of an aircraft comprising,
receiving a forward thrust control command;
generating a control signal based on the forward thrust control command; and
using the control signal to generate a pitch angle command and a forward thrust engine throttle command based on a bounded pitch angle for the aircraft, wherein the pitch angle command is generated such that a resultant aircraft pitch angle does not exceed the bounded pitch angle;
wherein the forward thrust engine throttle command in combination with the resultant aircraft pitch angle achieve a determined amount of forward velocity.

20. The method of claim 19, wherein generating the forward thrust engine throttle command based on the pitch angle command comprises determining a residual amount of forward thrust needed to achieve the determined amount of forward velocity based on the limited pitch angle command and generating the forward thrust engine throttle command to at least partially provide the determined residual amount of forward thrust.

21. The method of claim 19, wherein generating the forward thrust engine throttle command based on the limited pitch angle command comprises: determining a forward velocity generated as a result of the limited pitch angle command; determining a difference in forward velocity between the forward velocity generated as a result of the resultant aircraft pitch angle and the determined amount of forward velocity; generating a residual pitch angle command based on the determined difference in forward velocity; and converting the residual pitch angle command to the forward thrust engine throttle command.

22. The method of claim 21, wherein the residual pitch angle command is computed as a function of a difference between a velocity achieved with the limited pitch angle and the determined amount of forward velocity.

23. The method of claim 19, further comprising: comparing a determined bounded pitch angle for the aircraft to the a pitch angle corresponding to the control signal; generating a limited pitch angle command so the resultant aircraft pitch angle does not exceed the bounded pitch angle; generating a residual pitch angle command based on a difference between the determined amount of forward velocity and the amount of forward velocity achieved by the limited pitch angle command; and converting the residual pitch angle command into the forward thrust engine throttle command.

24. The method of claim 19, wherein the determined amount of forward velocity comprises a difference between an actual forward velocity of the aircraft and a desired forward velocity of the aircraft.

25. The method of claim 19, further comprising converting the limited pitch angle command to a VTOL rotor command and providing the VTOL rotor command to a vertical propulsion system of the aircraft.

26. The method of claim 19, wherein the control signal comprises a pitch angle command to control the pitch angle of the aircraft to at least partially control forward velocity of the aircraft.

27. The method of claim 19, wherein the control signal comprises a forward thrust pseudo-control that maps to a pitch angle of the unmanned aircraft to increase forward velocity of the unmanned aircraft.

28. The method of claim 27, wherein the forward thrust pseudo-control is based on a magnitude of a velocity error between a desired aircraft velocity and an actual aircraft velocity.

29. The method of claim 19, wherein the forward thrust control command is generated based on a throttle position of a throttle control of the aircraft or based on a desired aircraft speed for the aircraft.

30. The method of claim 1, wherein the bounded pitch angle is determined based on flight conditions.

* * * * *